United States Patent
Draisbach

(10) Patent No.: US 8,297,896 B2
(45) Date of Patent: Oct. 30, 2012

(54) HOLDING DEVICE AND HOLDING APPARATUS FOR A CARGO SPACE OF A MOTOR VEHICLE

(75) Inventor: Mike Draisbach, Wörrstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 305 days.

(21) Appl. No.: 12/624,803

(22) Filed: Nov. 24, 2009

(65) Prior Publication Data

US 2010/0133867 A1    Jun. 3, 2010

(30) Foreign Application Priority Data

Nov. 27, 2008    (DE) .......................... 10 2008 059 254

(51) Int. Cl.
*B60P 7/08* (2006.01)

(52) U.S. Cl. .......... 410/130; 410/96; 410/117; 410/121; 410/150

(58) Field of Classification Search ................ 410/8, 96, 410/97, 100, 104, 117, 118, 121, 130, 150, 410/145, 149; 24/300, 301; 224/403, 563; 248/354.3, 354.6, 499
See application file for complete search history.

(56) References Cited

U.S. PATENT DOCUMENTS

| | | | |
|---|---|---|---|
| 4,737,056 A | 4/1988 | Hunt | |
| 6,783,311 B2 * | 8/2004 | Sauerwald | 410/97 |
| 7,387,482 B2 * | 6/2008 | Kmita et al. | 410/150 |
| 2006/0093454 A1 | 5/2006 | Kmita et al. | |
| 2007/0110539 A1 | 5/2007 | Klinkman et al. | |
| 2008/0142560 A1 | 6/2008 | Lim | |

FOREIGN PATENT DOCUMENTS

| | | |
|---|---|---|
| DE | 4132954 A1 | 4/1993 |
| DE | 10134887 A1 | 2/2003 |
| DE | 10134889 A1 | 2/2003 |
| DE | 102005030165 A1 | 5/2006 |
| DE | 202005011556 U1 | 11/2006 |
| DE | 102005031070 A1 | 1/2007 |
| EP | 0535426 A1 | 4/1993 |
| EP | 2048028 A1 | 4/2009 |

OTHER PUBLICATIONS

British Patent Office, British Search Report for British Application No. GB0920544.4, Feb. 26, 2010.
German Patent Office, German Search Report for Application No. 102008059254.4, dated Mar. 27, 2009.

* cited by examiner

*Primary Examiner* — Stephen Gordon
(74) *Attorney, Agent, or Firm* — Ingrassia Fisher & Lorenz, P.C.

(57) ABSTRACT

A motor vehicle is provided having at least one holding device, a holding device having a holding apparatus, and a holding apparatus for a guide device having two guides spaced apart from one another, in which the holding apparatus can be situated so it is movable, having one holding unit and one guide element per guide, which are coupled to the holding unit and using the holding unit can be coupled to the guides so it is movable, in order to move the holding unit along the guides, angle compensator or angle compensation means is provided that allows movement of one of the guide elements at least along the guide upon the adjustment of at least one of the other guide elements in relation to the guide.

10 Claims, 1 Drawing Sheet

HOLDING DEVICE AND HOLDING APPARATUS FOR A CARGO SPACE OF A MOTOR VEHICLE

CROSS-REFERENCE TO RELATED APPLICATION

This application claims priority to German Patent Application No. 102008059254.4, filed Nov. 27, 2008, which is incorporated herein by reference in its entirety.

TECHNICAL FIELD

The invention relates to a holding apparatus for a guide device having two guides, which are situated and spaced apart from one another, and in which the holding apparatus can be situated so it is movable. Furthermore, the invention relates to a holding device, in particular for a cargo space of a motor vehicle, for the adjustable setting of holding spaces for holding cargo. In addition, the invention relates to a motor vehicle.

BACKGROUND

Various holding devices are known from the prior art for a cargo space of a motor vehicle, by which holding spaces may be defined for securely stowing cargo, in particular during the travel of a motor vehicle.

A cargo space system is known, for example, from DE 20 2005 011 556 U1, which is mounted in diametrically opposing guide elements, the guide elements being situated running in at least two directions of a cargo space. At least one shunt element is associated with the guide elements in such a way that the guide element which runs in one direction is connectable to the guide element which runs in the other or the same direction, so that the cargo element can be transferred from one guide element into the other guide element without being dismounted.

A cargo space functional device for a motor vehicle, in particular a passenger automobile, is known from DE 10 2005 031070 A1, having at least two parallel guide rails, which are associated with at least one cargo space delimiting surface, at least one functional carriage being mounted so it is longitudinally movable in each guide rail, and blocking means being provided for locking the functional carriage relative to the guide rail. At least one functional carriage is associated with each guide rail and an at least sectionally dimensionally-stable transverse extension unit is provided that extends between the guide rails and is connected to the functional carriages.

It is at least one object of the present invention to provide a holding apparatus, using which a more flexible implementation of holding spaces can be implemented. Furthermore, it is at least one object of the present invention to provide a holding device for the adjustable setting of holding spaces for holding cargo, which is optimally adaptable to a cargo space and can form flexible holding spaces. It is still a further object of the present invention to provide a motor vehicle having a cargo space, the cargo space being implemented as optimized for housing cargo. Furthermore, other objects, desirable features, and characteristics will become apparent from the subsequent summary and detailed description, and the appended claims, taken in conjunction with the accompanying drawings and this background.

SUMMARY

These and further objects are achieved starting from a holding unit according, a holding device, and a motor vehicle. Advantageous refinements of embodiments of the invention are disclosed.

The embodiments of the invention include the technical teaching that in a holding apparatus to be coupled to a guide device having two guides, which are situated spaced apart from one another, and in which the holding apparatus can be situated so it is movable, having one holding unit and one guide element per guide, which are coupled to the holding unit and using which the holding unit can be coupled to the guides so it is movable, in order to move the holding unit along the guides, it is provided that angle compensation means are provided, which allow a movement of one of the guide elements at least along the guide when fixing at least one of the other guide elements in relation to the guide. The guide device can be implemented as a rail system, for example. Correspondingly, the guides may be implemented as rails, sliding elements, or the like. The guides may be implemented as parallel, but may also be implemented differently in regard to their spacing to one another, for example, also curved or lying in different planes. The guide elements may thus be moved at an angle to one another using the angle compensation means, i.e., along nonparallel rails or guides. The guides do not have to be implemented parallel to one another, but rather may be situated at an angle to one another or along a predefinable contour, for example, a cargo space contour. The guides are preferably implemented as rails, in which the guide elements are situated so they are movable. For example, the rails may have grooves for this purpose, in which the guide elements are inserted and movable. The angle compensation means are implemented so that when one guide element is fixed, the other guide element is movable to the fixed guide element because of the angle compensation means. The mobility of the other guide element is also provided if the first guide element is not fixed. The angle compensation means may be implemented correspondingly for this purpose.

In one embodiment of the present invention, it is provided that the angle compensation means are implemented as elastic and/or rotational and/or translational angle compensation means. The angle compensation means may particularly comprise an elastic element, which permits a movement of the other guide element upon fixing of one guide element, jamming or damage not occurring because of the elasticity. The elastic element can be implemented as elastic in a translational direction and/or in a rotational direction.

Moreover, the angle compensation means may be implemented as rotational, so that a rotational movement of one guide element is possible upon fixing of the other guide element. The angle compensation means may also be implemented as translational, so that upon fixing of one guide element, a translational movement of the other guide element is possible. The angle compensation means may also be implemented as a combination of the previously listed compensation means.

In another embodiment of the present invention, it is provided that the rotational angle compensation means comprise at least one jointed unit having at least one pivot axis, which, upon fixing of one of the guide elements during movement of at least one of the other guide elements along the guides, allows a rotational movement of the holding unit coupled thereto around the fixed guide element. The pivot axis is preferably implemented perpendicularly to a cargo floor. Multiple pivot axes may be provided, so that a rotation around multiple axes may be implemented.

In still another embodiment of the present invention, it is provided that the translational angle compensation means comprise a length compensation mechanism in order to allow, upon fixing of one guide element, a movement of at least one of the other guide elements by changing the length of the holding apparatus and/or the holding unit between the guides. The length compensation mechanism can comprise a telescope unit, which retracts or extends upon a length compensation. The length compensation mechanism can also comprise two or more segments displaceable to one another, which are not displaceable one inside the other as in a telescope, but rather are displaceable past one another. In addition, the length compensation mechanism can also be implemented as controlled via gearwheels or other guide means. The length compensation can occur in one direction or in two directions.

In still another embodiment of the present invention, it is provided that the elastic angle compensation means comprise at least one elastic body, in order to allow a translational and/or rotational movement of the holding apparatus when fixing one of the guide elements and moving at least one of the other guide elements.

Still a further embodiment of the present invention provides that fixing means are provided, in order to fix at least one of the angle compensation means and/or at least one of the guide elements and/or the holding apparatus. The fixing means may be implemented so that they are fixable continuously, i.e., in an arbitrary position on the guides, alternatively, discrete locations and/or fixing means may be provided, so that fixing is only possible at predetermined defined locations. The fixing means may act positively and/or non-positively and/or by material bonding.

The invention additionally includes the technical teaching that in a holding device, in particular for a cargo space of a motor vehicle, for adjustably setting holding spaces for holding cargo, comprising at least one guide device having at least two guides, which are situated spaced apart from one another and are attachable to the cargo space, it is provided that at least one holding apparatus according to the invention is provided. A holding device can be implemented arbitrarily using fasteners, for example, using compartments, hooks, straps, elastic bands, and the like. The compartments or spaces for holding cargo may be implemented flexibly. Corresponding spaces may be delimited by one holding apparatus according to the invention or by multiple holding apparatuses. Multiple holding apparatuses may be provided for more flexible implementation of corresponding compartments or spaces. In addition, multiple guides may be provided, for example, in the form of multiple rails.

In one embodiment of the present invention, it is provided that the guides are at least sectionally implemented as non-parallel and/or in various planes to one another relative to a cargo floor plane of the cargo space. The cargo space has at least one essentially level cargo floor, which extends in a cargo floor plane. For the most flexible possible design of the holding spaces or compartments, it is provided that the rails are situated correspondingly in the cargo space, parallelism or aligned orientation not having to be ensured. Rather, the guides may be adapted to a vehicle contour or a cargo space contour and may thus be implemented as curved, for example.

In a further embodiment of the present invention, it is provided that the guides are implemented as at least sectionally linear, running in a straight line, and/or nonlinear. In this way, a cargo space may be optimally exploited.

The embodiments of the invention also include the technical teaching that in a motor vehicle having at least one cargo space, it is provided that at least one holding device according to the invention is provided. Multiple holding devices may be provided.

Further measures which improve the invention are disclosed result from the following description of exemplary embodiments of the invention, which are schematically shown in the figures. Uniform reference numerals are used for identical or similar parts or features. Features or parts of various embodiments may be combined with one another, in order to thus obtain further embodiments. All features and/or advantages disclosed in the claims, the description, or the drawings, including constructive details, spatial configuration, and method steps, may be essential to the invention per se and also in various embodiments.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
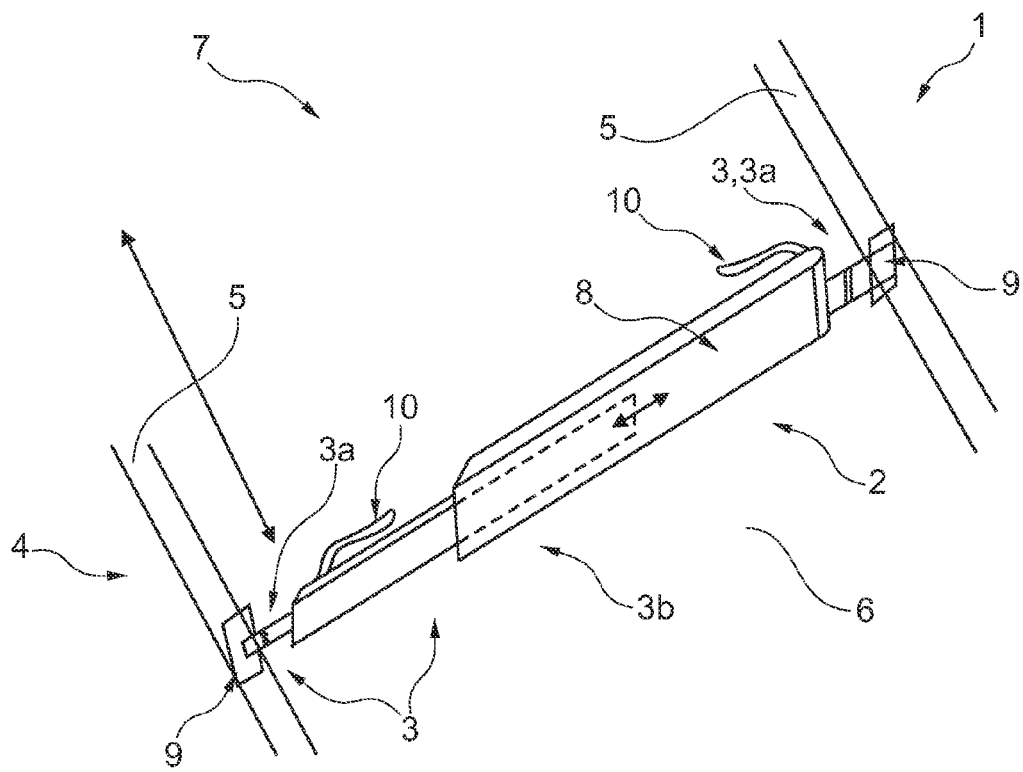
FIG. 1 schematically shows a perspective view of a holding device having a holding apparatus having angle compensation means.

FIG. 1 schematically shows a perspective view of a holding device 1 having a holding apparatus 2 having angle compensation means 3. Furthermore, the holding device 1 comprises a guide device 4 having two guides 5, situated spaced apart from one another. The guides 5 are implemented in the present case as rail-like guides, which are attached to a cargo space floor 6 (only indicated schematically here) of a cargo space 7 (also only indicated schematically) of a motor vehicle. The guides 5 may be implemented as terminating flush with the cargo space floor 6, or may protrude arbitrarily above it. The holding apparatus 2 is received guided in or along the guides 5, so that it is movable in the guides 5 or along the guides 5. The holding apparatus 2 comprises at least one holding unit 8, which extends essentially transversely to the guides 5 and is preferably implemented as an oblong holding unit 8 between the guides 5. The holding unit 8 has one guide element 9 associated with each guide 5, via which the holding unit 8 is coupled to the guides 5 and using which the holding unit 8 is movable along the guides 5. The guide elements 9 may be implemented as carriages, wagons, sliding elements, or the like. The holding apparatus 2 also comprises angle compensation means 3. The angle compensation means 3 comprise both rotational angle compensation means 3a and also translational angle compensation means 3b in the present exemplary embodiment, elastic angle compensation means also being able to be provided separately or integrated. In the present case, rotational angle compensation means 3a are implemented in a connection area of the holding unit 8 to the guide elements 9, for example, in the form of a pivot joint. The holding unit 8 additionally has translational angle compensation elements 3b, which are implemented in such a manner that the holding unit 8, which comprises two parts movable to one another, is extendable and retractable via the translational angle compensation elements 3b i.e., is translationally changeable in a longitudinal direction of the holding unit. This can be implemented, for example, by telescopic translational angle compensation means 3b. The translational angle compensation means 3b are preferably extendable in an extension direction of the holding unit 8. The rotational angle compensation means 3a may allow a rotation around multiple axes. In order to fix the holding unit 8, corresponding fixing means 10 are provided, in order to fix at least the angle compensation means 3 and/or one of the guide elements 9 and/or the holding apparatus 2. The fixing means 10 can be actuated via corresponding handles. Multiple fixing means 10 having handles are preferably provided.

The orientation of the guides 5 essentially parallel and spaced apart from one another is shown in FIG. 1. In the event of a simultaneous, synchronous movement of the guide elements 9 in the same direction along the guides 5, the angle compensation means are not absolutely necessary, because no angle or length changes must be compensated for. In other embodiments, the guides do not run parallel.

Figure 2:
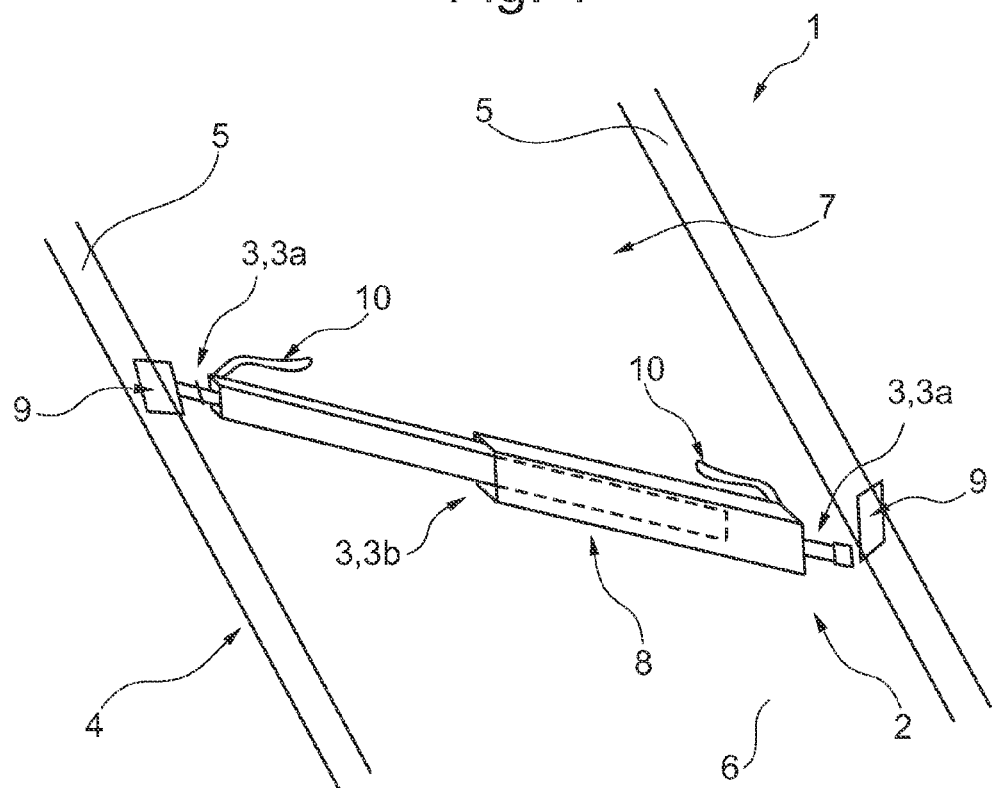
FIG. 2 shows the holding device according to FIG. 1, the holding unit being moved into an angled position.

A nonparallel adjustment along the parallel guides 5 is shown in FIG. 2, i.e., the guides 5 are moved unequally to one another or one of the guide elements 9 is moved and the other is fixed or remains fixed. The translational angle compensation means 3b cause a movement of the holding unit 8, i.e., a lengthening or a retraction. The rotational angle compensation means 3a additionally or separately causes a rotation or a pivot of the holding unit 8. The holding unit 8 may be fixed in a desired position in relation to the guides 5 via the lever or the fixing means 10, so that the most flexible possible cargo space can be formed by the holding unit 8 and the cargo space floor 6 in the cargo space 7, the holding space being at least partially delimited by the holding unit 8.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A holding apparatus to be coupled to a guide device, comprising:
    a first guide and a second guide spaced apart from one another in which the holding apparatus can be situated to be movable;
    a holding unit;
    a first guide element for the first guide and a second guide element for the second guide that are coupled to the holding unit, and adapted to couple the holding unit to the first guide and the second guide so as to be movable in order to move the holding unit along the first guide and the second guide; and
    at least one angle compensator that is adapted to provide a movement of one of the first guide element and the second guide element at least along one of the first guide and the second guide when fixing at least one of the first guide element and the second guide element in relation to at least one of the first guide and the second guide,
    wherein the at least one angle compensator includes
        a first angle compensator configured to allow a pivoting of the holding unit about at least two pivot axes when the first guide element is fixed within the first guide and the second guide element is moved, and
        a second angle compensator comprising a length compensation mechanism configured to allow movement of at least one of the first guide element and the second guide element by changing a length of the holding unit, the second angle compensator including a first portion that translates inside a second portion to change the length of the holding unit, wherein the first angle compensator is implemented as an elastic angle compensator.

2. The holding apparatus according to claim 1, wherein the elastic angle compensator comprises at least one elastic body that is adapted to allow movement of the holding apparatus upon fixing at least one of the first guide element and the second guide element and movement of at least one of the other of the first guide element and the second guide element.

3. The holding apparatus according to claim 1, further comprising a fixer that is adapted to fix at least one of the first angle compensator, the first guide element, the second guide element and the holding apparatus.

4. The holding apparatus according to claim 1, wherein the first guide and the second guide are implemented as at least sectionally nonparallel.

5. The holding apparatus according to claim 1, wherein the first guide and the second guide are implemented in various planes to one another in relation to a cargo floor plane of the cargo space.

6. The holding apparatus according to claim 4, wherein the first guide and the second guide are implemented as at least sectionally linear and running in a substantially straight line.

7. A motor vehicle, comprising:
    a cargo space; and
    a holding device for the cargo space that is adapted to adjust a setting of holding spaces for holding cargo, the holding device comprising:
        a guide device having at least a first guide and a second guide that are spaced apart from one another and attachable to the cargo space;
        a holding unit;
        a first guide element for the first guide and a second guide element for the second guide that are coupled to the holding unit, and adapted to couple the holding unit to the first guide and the second guide so as to be movable in order to move the holding unit along the first guide and the second guide; and
        at least one angle compensator that is adapted to provide a movement of one of the first guide element and the second guide element at least along one of the first guide and the second guide when fixing at least one of the first guide element and the second guide element in relation to at least one of the first guide and the second guide,
        wherein the at least one angle compensator includes
            a first angle compensator configured to allow a pivoting of the holding unit about at least two pivot axes when the first guide element is fixed within the first guide and the second guide element is moved, and
            a second angle compensator comprising a length compensation mechanism configured to allow movement of at least one of the first guide element and the second guide element by changing a length of the holding unit, the second angle compensator including a first portion that translates inside a second portion to change the length of the holding unit, wherein the first angle compensator is implemented as an elastic angle compensator.

8. The holding device according to claim 7, wherein the first guide and the second guide are implemented as at least sectionally nonparallel.

9. The holding device according to claim 7, wherein the first guide and the second guide are implemented in various planes to one another in relation to a cargo floor plane of the cargo space.

10. The holding device according to claim 8, wherein the first guide and the second guide are implemented as at least sectionally linear and running in a substantially straight line.

* * * * *